G. I. DE FORCE.
DETACHABLE HORSESHOE CALK.
APPLICATION FILED OCT. 3, 1912.

1,092,634.

Patented Apr. 7, 1914.

WITNESSES
S. C. Wade
C. E. Tramor

INVENTOR
George I. De Force.
BY Munn & Co.
ATTORNEYS

UNITED STATES PATENT OFFICE.

GEORGE I. DE FORCE, OF ERIE, PENNSYLVANIA, ASSIGNOR OF ONE-THIRD TO LYNN ELLSWORTH STANCLIFF AND ONE-THIRD TO WILBUR LYNN BANKSON, OF ERIE, PENNSYLVANIA.

DETACHABLE HORSESHOE-CALK.

1,092,634.         Specification of Letters Patent.         Patented Apr. 7, 1914.

Application filed October 3, 1912. Serial No. 723,770.

*To all whom it may concern:*

Be it known that I, GEORGE I. DE FORCE, a citizen of the United States, and a resident of Erie, in the county of Erie and State of Pennsylvania, have invented certain new and useful Improvements in Detachable Horseshoe-Calks, of which the following is a specification.

My invention is an improvement in detachable horse shoe calks, and has for its object the provision of a calk of the character specified, capable of quick attachment and detachment, which may be attached without loosening or removing the shoe, which will not engage the hoof of the horse nor incommode the horse in any way, and which will fit any shape hoof, and which is so arranged that the greater the strain the more tightly will the device grip the shoe.

A further object is to provide an article that does not require skilled labor for its attachment or removal, which may be furnished at a low cost.

Figure 1:
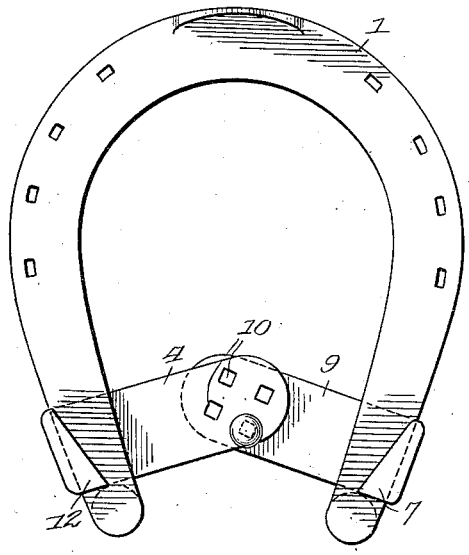

In the drawings: Figure 1 is a top plan view of a horse shoe with the improved calk in place, Fig. 2 is a bottom plan view of the same, Fig. 3 is a perspective view of one of the sections of the improved calk looking from above, Fig. 4 is a similar view of the other section looking from below, Fig. 5 is a perspective view of a modified form, and Fig. 6 is a section on the line 6—6 of Fig. 5.

Figure 2:
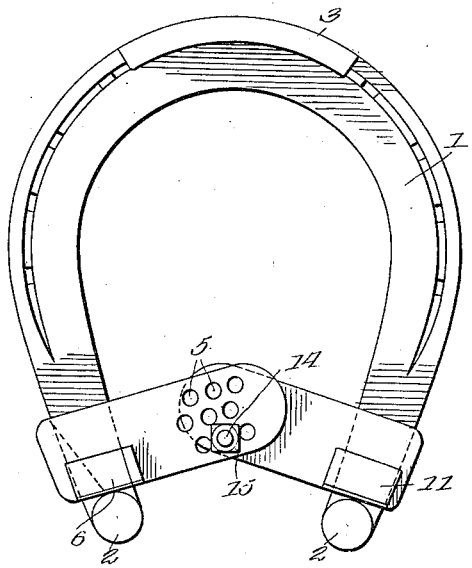
Figure 3:
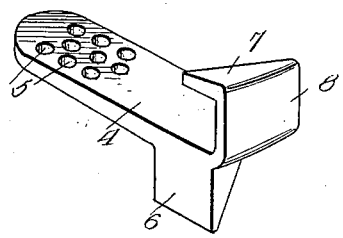
Figure 4:
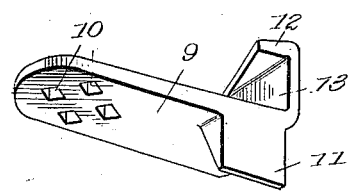

The embodiment of the invention shown in Figs. 1 to 4 is shown applied to a horse shoe 1 of ordinary form, having the usual dull or blunt heel calks 2 and toe calks 3. The present device is composed of two sections, each having a sharp calk and embracing one side of the shoe. As shown in Fig. 3, one of the sections 4 is in the form of a plate or bar having at one end a plurality of series of openings 5, the said series being arranged in three rows and with three openings in each row. At the opposite end the bar or plate is provided with a downwardly extending calk 6, and with an overlying flange 7 connected to the end of the plate or bar by means of a web 8. It will be noticed that one face of the calk is perpendicular and that the said face is flush with the rear edge of the section, and that that end of the flange 7 adjacent to the said face of the calk is of greater width than the other end. That is, the widest portion of the flange 7 is at the rear of the section, and the width of the flange gradually decreases toward the front edge of the section. This construction is more particularly brought out in Fig. 1. The outer section 9 of the calk is also in the form of a plate or bar and is provided at one end with a plurality of series of openings 10, two series being provided with two openings in each series, and the said openings 10 are square in cross section, while the openings 5 are round or circular in cross section. The section 9 is provided at the opposite end from the openings 10 with a depending calk 11 whose rear face is perpendicular and flush with the edge of the plate or bar as shown in Fig. 4. At the said end, the section is provided with an overlying flange 12, similar in all respects to the flange 7 of the section 4, the said flange 12 being connected to the section 9 by a web 13. The flange 12 is of greatest width at the rear edge of the section, and gradually decreases in width toward its front end. Both of the flanges 7 and 12 are adapted to overlie the upper face of the shoe 1, and the said flanges are shaped as described and shown in order that they will not interfere with the hoof of the horse. A bolt 14 is made use of for connecting the sections, the said bolt being square in cross section adjacent to the head to fit an opening 10 and being rounded adjacent to the threaded portion to fit the opening 5 and the bolt is engaged by a nut 15 to hold it in place.

The sections 4 and 9 of the calk are arranged as shown in Figs. 1 and 2, that is, the said calks are arranged transversely of the lower face of the shoe, one at each side thereof and with the rear edge of the calk in contact with the blunt calk or heel 2 of the shoe. The webs 8 and 13 of the said calks engage with their inner faces the outer edges of the shoe, and the flanges 7 and 12 overlie the upper faces of the shoe. By means of a pointed instrument, which is engaged with an opening 5, and the opening 10, another pair of the said openings 5 and 10 may be brought into register in order to permit the insertion of the bolt 14. Sufficient pressure should be exerted to cause the webs 8 and 13 to closely engage the outer edges of the shoe, in order that the sections may be held firmly in place. After the bolt has been inserted, the nut 15 is threaded on to the same, and the calk sections are firmly held in place. The blunt calks of heels 2 of the shoe prevent the calk sections from slipping rearwardly and the curve of the arm of the shoe prevents any slipping forward of the sections. The greater the strain on the calk sections, the more tightly they are pressed against the shoe. As for instance, the strain on the calk section tends to slip them toward the toe calk 3, so that the greater the strain the more tightly they are pressed toward the wide part of the shoe, and the more firmly the sections are held in place. The only manner in which the sections could be disengaged would be to slip them forwardly over the widest portion of the shoe, and this would of course be impossible. It is not necessary to remove the shoe nor even to loosen the nails in order to place the calks, since they are at no time between the hoof and the shoe. It will be understood that a portion of the shoe at the heel extends beyond the hoof and this is the portion engaged by the calk sections. The blunt calks 2 of the shoe are usually formed by bending the point of the arms of the shoe downwardly slightly and this is sufficient to hold the calk sections in place.

Figure 5:
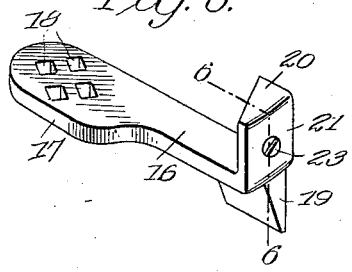
Figure 6:
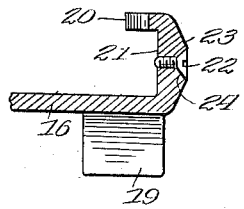

In Figs. 5 and 6 an embodiment of the invention is shown, especially adapted for use with light shoes. In this construction, each section 16 of the calk is of lesser width than the sections 4 or 9, and at one end the said plate or bar 16 is enlarged laterally at one side, the front for instance, as shown at 17, and the openings 18 are arranged in this enlarged portion. At the opposite end, the plate or bar is provided with a depending calk 19 and with the overlying flange 20 connected to the plate or bar by the web 21. The flange 20 is in all respects the same as the flange 7 or 12 being widest at its rear and decreasing in width toward its front. The flange 20 is designed to overlie the upper face of the shoe, and a set screw 22 is threaded through the web 21, the said web being enlarged or thickened on its outer face as shown at 23 in Fig. 6. The screw 22 is threaded through this enlarged portion, and the said portion is countersunk on its outer face as shown at 24 to receive the head of the screw 22. The other section is in all respects the same as that shown in Figs. 5 and 7, except that round openings are provided instead of the square openings 18. When this construction is placed, the screws 22 may be turned until the inner ends thereof engage the edge of the shoe to tighten the calk of the shoe. The screw will thus compensate for looseness, and may be used to insure a tighter fit of the calk sections. The construction shown in Figs. 5 and 6 is preferably of aluminum for the sake of lightness, while the construction shown in Figs. 1 to 4 may be of cast steel or other suitable material.

It will be evident that no special form of horse shoe is required, the ordinary shoe serving perfectly to hold the calk sections in place. It will be also evident that no special skill is required to place the calk sections nor is any special tool necessary. The calk sections may be placed or removed in a minimum of time, and since each calk, that is, the outfit for each shoe consists of but two pieces, and the said pieces practically the same, it will be evident that the cost of the calks will be small. There is no chance of the sections becoming loosened, and the provision of the square portion of the bolt engaging the square openings prevents turning of the bolt. The flanges 7, 12 and the webs 8, 13 constitute a clip for engaging the outer edge and upper face of one side of the shoe, while the bolt and the openings constitute a means for adjustably securing the sections of the calk together.

I claim:—

1. A detachable calk for horseshoes consisting of two sections, each section comprising a plate adapted to lie transversely of the under face of the shoe and having at its inner end a plurality of openings and at its outer end and on its lower face a calk and on the upper face an overlying flange offset laterally from the face of the plate and connected to the end of the plate by a web, said web being adapted to engage the outer edge of the shoe with the flanges overlying the shoe, said flanges being of greatest width at the rear edge of the calk and decreasing in width toward the front edge, the openings of each section being arranged in a plurality of approximately longitudinal series, and the openings of one section being square in cross section and those of the other section circular in cross section, and a bolt for connecting the sections together, said bolt having a portion adjacent to its head rectangular in cross section for fitting the square openings, a nut engaging the bolt, and a set screw threaded through the web of each section for engaging the end of the shoe.

2. A detachable calk for horseshoes consisting of two sections, each section comprising a plate adapted to lie transversely of the under face of the shoe and having at its inner end a plurality of openings and at its outer end on its lower face a calk and on the upper face an overlying flange offset laterally from the face of the plate and connected to the end of the plate by a web, said web being adapted to engage the outer edge of the shoe with the flange overlying the shoe, said flange being of greatest width at the rear edge of the calk and decreasing in width toward the front edge, the openings of each section being arranged in a plurality of approximately longitudinal series, and the openings of one section being square in cross section and those of the other section round in cross section, and a bolt for connecting the sections together, said bolt having a portion adjacent to its head rectangular in cross section for fitting the square openings, and a nut engaging the bolt.

3. A detachable calk consisting of two sections, each section comprising a plate adapted to lie transversely of the under face of the shoe and having at its inner end a plurality of openings and at the outer end on its lower face a calk and on the upper face an overlying flange offset laterally from the face of the plate and connected to the end of the plate by a web, said web being adapted to engage the outer edge of the shoe with the flange overlying the shoe, said flange being of greatest width at the rear edge of the calk and decreasing in width toward the front edge, the openings of one section being square in cross section and those of the other section being round, and a bolt for connecting the sections, said bolt having a squared portion adjacent to the head for engaging the square openings, and a nut threaded on to the bolt.

4. A device of the character specified, comprising a plurality of sections, each section consisting of a plate adapted to lie transversely of the under face of one side of a horse shoe with one edge in engagement with the blunt calk of the shoe, each section having its inner end provided with a plurality of openings, sundry of which are adapted to register with the openings of the other section, each plate having at its outer end and on its under face a calk and on its upper face a flange offset upwardly from the upper face of the plate and connected to the outer end of the plate by a web, the web of each section being adapted to engage the outer edge of the shoe and the flange of each section being adapted to overlie the upper face of the shoe, and a bolt engaging the openings to connect the sections together, each of the said flanges being of greatest width at the rear edge of the section, and gradually decreasing in width toward the front edge.

5. A device of the character specified, comprising a plurality of sections, each section consisting of a plate adapted to lie transversely of the under face of one side of a horse shoe with one edge in engagement with the blunt calk of the shoe, each section having its inner end provided with a plurality of openings, sundry of which are adapted to register with the openings of the other section, each plate having at its outer end and on its under face a calk and on its upper face a flange offset upwardly from the upper face of the plate and connected to the outer end of the plate by a web, the web of each section being adapted to engage the outer edge of the shoe and the flange of each section being adapted to overlie the upper face of the shoe, and a bolt engaging the openings to connect the sections together.

6. A device of the character specified, comprising a plurality of sections, each section being adapted to lie transversely of the under face of one side of a horse shoe near the heel thereof and having a plurality of openings at its inner end, each section having a calk on its under face and having at its outer end a flange offset upwardly and adapted to overlie the upper face of the shoe at the rear of the hoof, a web connecting the flange to the outer end of the section, said sections being of a length to overlap at their inner ends, and means engaging the registering openings for connecting the sections together.

GEORGE I. DE FORCE.

Witnesses:
C. E. TRAINOR,
SOLON C. KEMON.

---

Copies of this patent may be obtained for five cents each, by addressing the "Commissioner of Patents, Washington, D. C."